US012477070B1

(12) United States Patent
Chen et al.

(10) Patent No.: US 12,477,070 B1
(45) Date of Patent: Nov. 18, 2025

(54) MACHINE-LEARNING ASSISTED ACOUSTIC ECHO CANCELATION

(71) Applicant: Zoom Video Communications, Inc., San Jose, CA (US)

(72) Inventors: Yuhui Chen, San Jose, CA (US); Zhaofeng Jia, Saratoga, CA (US); Wei Wang, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 201 days.

(21) Appl. No.: 18/386,298

(22) Filed: Nov. 2, 2023

(51) Int. Cl.
*H04M 9/08* (2006.01)
*G10L 21/0208* (2013.01)
*G10L 25/30* (2013.01)

(52) U.S. Cl.
CPC ......... *H04M 9/082* (2013.01); *G10L 21/0208* (2013.01); *G10L 25/30* (2013.01); *G10L 2021/02082* (2013.01)

(58) Field of Classification Search
CPC ..... H04M 9/082; G10L 21/0208; G10L 25/30
See application file for complete search history.

(56) References Cited

U.S. PATENT DOCUMENTS

| 9,319,783 | B1* | 4/2016 | Barton | H04M 9/082 |
| 2016/0182770 | A1* | 6/2016 | Ushakov | G10L 21/0208 |
| | | | | 348/14.03 |
| 2017/0365247 | A1* | 12/2017 | Ushakov | H04B 3/237 |
| 2019/0349471 | A1* | 11/2019 | Ferguson | H04M 3/568 |
| 2023/0094054 | A1* | 3/2023 | Li | G10L 21/0232 |
| | | | | 704/226 |
| 2023/0353683 | A1* | 11/2023 | Song | G10L 21/0232 |
| 2024/0105198 | A1* | 3/2024 | Yang | G10L 15/26 |

* cited by examiner

*Primary Examiner* — Simon King
(74) *Attorney, Agent, or Firm* — Kilpatrick Townsend & Stockton LLP (57) ABSTRACT

Example methods and systems provide machine-learning assisted acoustic echo cancellation (AEC). The AEC can be used, as an example, to improve the audio quality for online audio and video conferences. A system according to this disclosure includes a pre-trained, machine-learning, AI model designed to detect, in real time, a unitary voice signal, or a signal representing the speech of a single speaker as opposed to that of multiple speakers. A digital signal processing (DSP) algorithm can then detect the echo state, for example, whether distortion results primarily from an echo. Based on these characteristics, the system can, alternatively and automatically apply either a default mode of AEC to the audio signal, or apply a more aggressive mode of AEC.

20 Claims, 8 Drawing Sheets

MACHINE-LEARNING ASSISTED ACOUSTIC ECHO CANCELATION

FIELD

The present application relates to online audio and video conferencing systems, for example, those that make use of a client application connected through real or virtual servers. More specifically, the present application relates to audio processing to improve the accuracy and effectiveness of acoustic echo cancelation (AEC) and thus also improve the intelligibility of participants in an online conference.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of systems and methods for providing machine-learning assisted acoustic echo cancelation (AEC). Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Online conferencing systems enable their users to create and attend conferences (or "meetings") via various types of client devices. After joining a meeting, the participants receive audio and/or video streams or feeds (or "multimedia" streams or feeds) from the other participants and, in the case of a videoconference, are presented with views of the video feeds from one or more of the other participants and audio from the audio feeds. Using these different modalities, the participants can see and/or hear each other, engage more deeply, and generally have a richer experience despite not being physically in the same space.

In the case of videoconferencing systems, to create a meeting, a person (referred to as the "host" or "meeting host") accesses the videoconferencing system, schedules a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. The initial, or main host can, in some systems, make another participant a co-host. For purposes of the discussion herein, the term "host" encompasses hosts and co-hosts. Hosts can manage and control the videoconferencing session.

To provide higher audio quality for users of modern digital telecommunication platforms and applications, a conferencing system according to this disclosure includes a machine-learning, AI model designed to detect, in real time, a unitary voice signal, such as a signal representing the speech of a single speaker as opposed to that of multiple speakers or sounds. A digital signal processing (DSP) algorithm can then detect the echo state, for example, whether distortion results primarily from an echo. Based on these characteristics, the system can apply a mode of AEC that is more aggressive than a default mode of AEC.

The combination AI and DSP AEC can be provided for audio in a conferencing system, such as audio generated at the far end of a two-way electronic conversation being output by a speaker element that acoustically affects a local microphone at a client device. Such an acoustic echo, introduced because a far-end voice signal influences a near-end input device, may be distorted, for example, with high reverberation, which can make it difficult for a standard AEC filter to converge, or can cause echo underestimation. Such distortion can also make it difficult for a DSP AEC algorithm to accurately detect and react to residual echo content. The machine-learning assisted AEC technique described herein can overcome these deficiencies.

A system according to some examples can access an audio signal and identify, using a trained, machine-learning model, the audio signal as a unitary voice signal. The system can apply a first mode of AEC to an audio frame of the unitary voice signal to produce a test frame and measure a residual echo in the test frame to produce a residual value. The system can then compare the residual value to a threshold, and apply a second, more aggressive mode of AEC to the audio signal based on the comparison. The system can apply the first mode of AEC to the audio signal to obtain some echo cancelation when the speech signal cannot be identified as a unitary voice signal.

The machine-learning assisted AEC can make use of a pre-trained model. In the examples herein, the model is trained using public domain or commercially licensed datasets that do not contain the personal information of any specific user or organization. An instance of the model can be retrained as new, improved datasets become available and delivered to client devices as part of an application update. Echo datasets used for training can include recording, clipping, distortion, and room simulation data. Single-word datasets used for training can include far-end interrupt echo data and near-end interrupt voice data. Training with single-word data can enable the system to react more quickly to the characteristics of a new or changing audio data stream. The machine-learning model can include neural networks with node weights and biases configured by the training datasets.

The techniques disclosed herein for providing machine-learning assisted AEC enable improved sound quality in audio and video conferences. By using machine-learning to verify the nature of a detected echo prior to ongoing echo cancelation, the intelligibility of speech can be improved. The machine-learning assisted AEC can be used with any type of client hardware since it adapts to each specific client device configuration.

This illustrative example is given to introduce the reader to the general subject matter discussed herein and the disclosure is not limited to this example. The following sections describe various additional non-limiting examples and examples of systems and methods for providing machine-learning assisted AEC for online conferencing.

Figure 1:
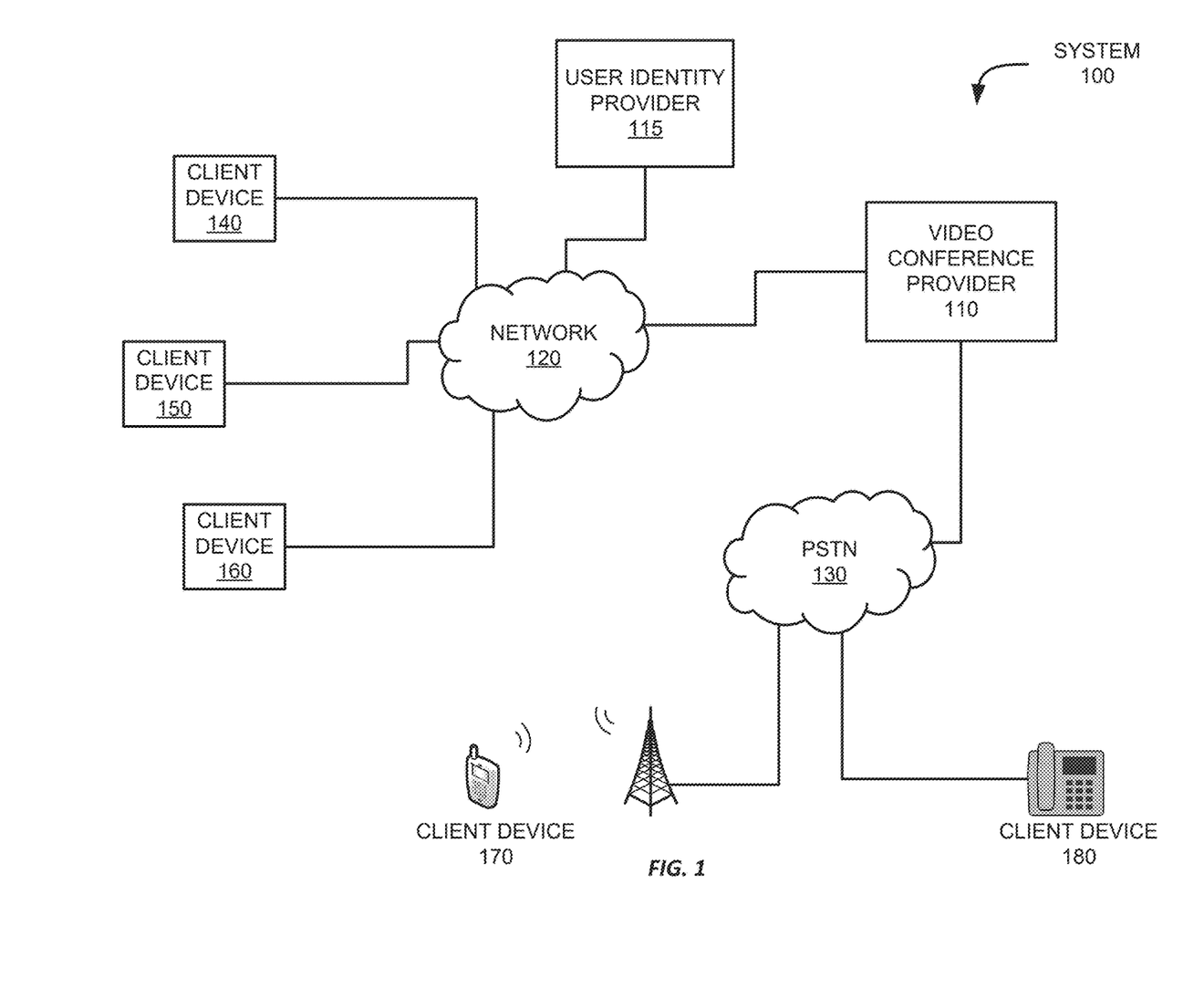
FIGS. 1-3 illustrate example systems to enable videoconferencing with AEC as described herein.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
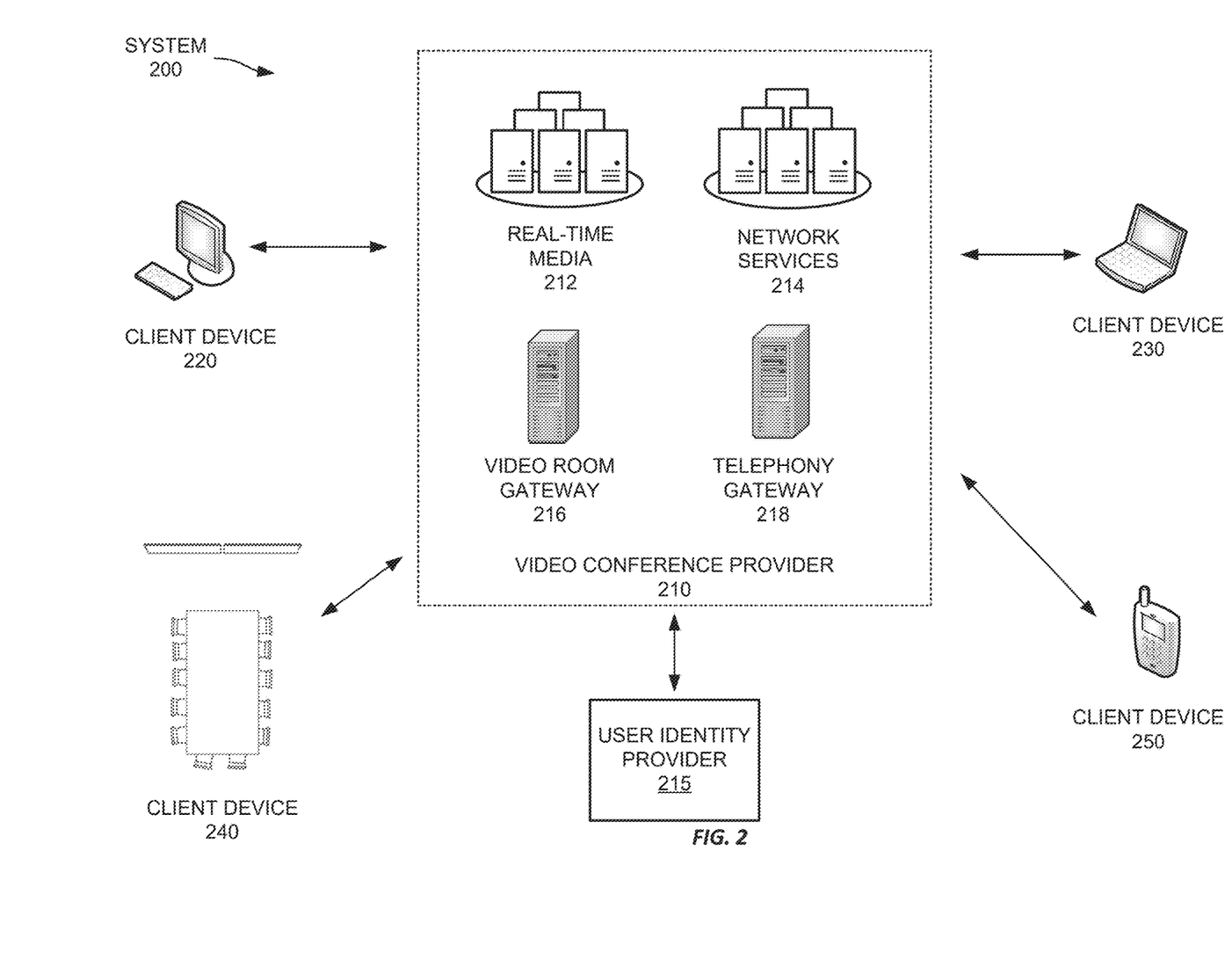

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the system of video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials.

Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
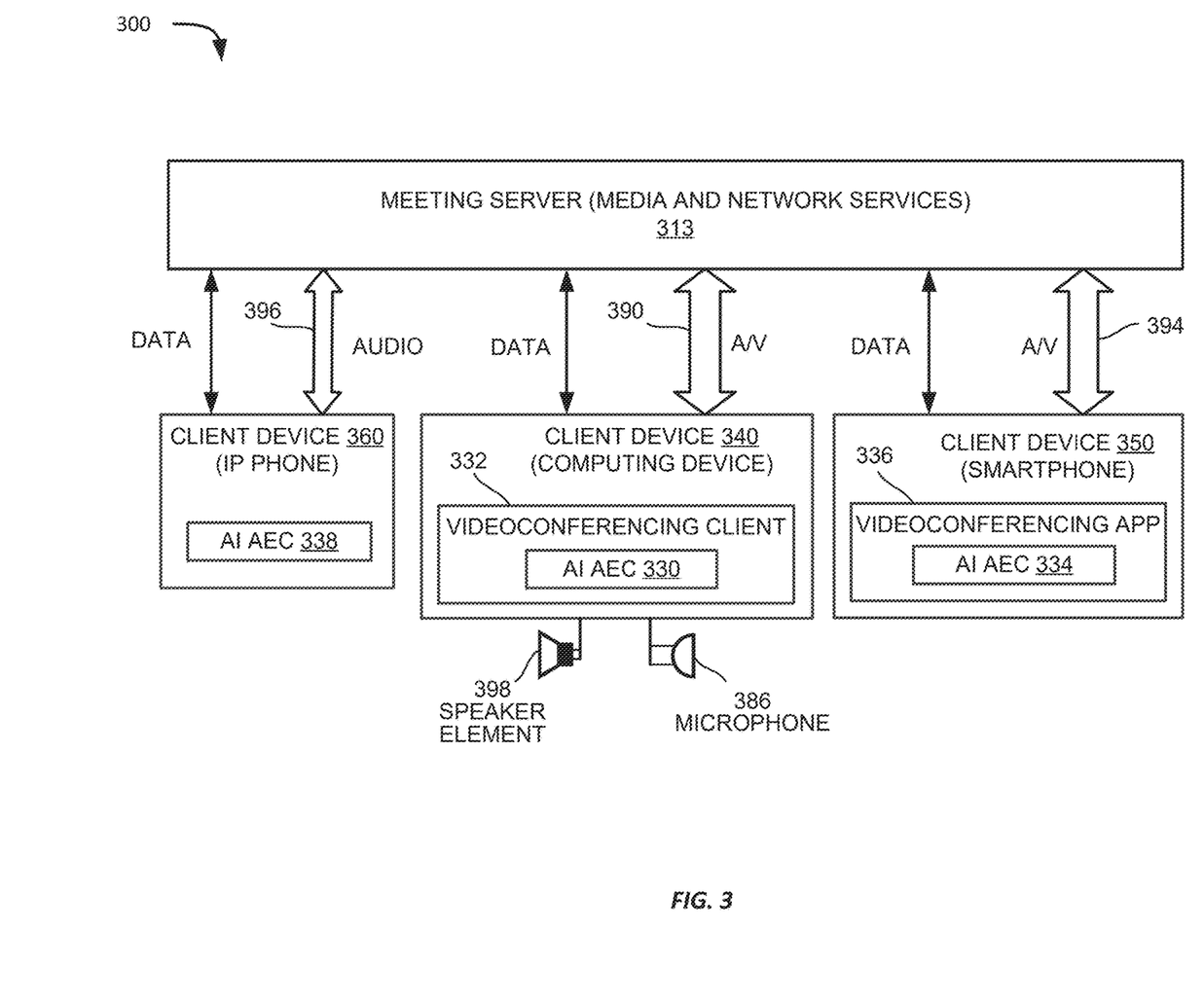

Referring to FIG. 3, FIG. 3 shows example system 300. Example system 300 includes meeting server 313. Meeting server 313 may also be referred to as a multimedia router and can be implemented by the real-time media servers 212 working with the network services servers 214. The meeting server can keep track of the status of meetings without constantly exchanging this information with client devices.

System 300 includes an AI AEC module 330 maintained on client device 340, which is coupled to meeting server 313 during a videoconferencing meeting. The AEC module 330 is part of a videoconferencing client application 332 installed on client device 340, which in this example is a computing device such as a desktop or notebook computer. An AEC module 334 is installed in client device 350, which in this example is a smartphone, but can be any suitable client device. AEC module 334 is part of a videoconferencing app 336. AEC module 338 is installed in client device 360, which in this example is an internet protocol (IP) telephone, but can be any suitable client device.

The various hardware configurations in use in a system such as system 300 may result in input audio signals for the AEC module having widely varying sampling rates. For example, dedicated telephony device such as IP telephone 360 may use an audio sampling rate of 8 kHz. Other devices may use higher sampling rates, such as 16 kHz, 32 kHz, or even 48 kHz, which may be used in audiovisual presentations such as movies and television shows. The same AEC module design can be used in different kinds of client devices with various sampling rates.

In system 300, client devices maintain an active data connection for any video or audio conference in which the host client device is participating. These data connections are illustrated with the single width, two-headed arrows in FIG. 3. The data connections are used for control, presence indication, chat, and other similar functions and can be maintained using TCP, for example. Additionally, audio/video (A/V) streams carry video and audio between the meeting server 313 and the client devices that are video capable. A/V stream 390 provides audio and video exchange between client device 340 and meeting server 313. A/V stream 394 provides audio and video exchange between client device 350 and meeting server 313. A/V streams, including the digital audio frames that make up the audio portion of the streams, can be provided using UDP. Telephone client device 360 in this example has no video capability. Audio stream 396, during an online conference, provides audio exchange between client device 360 and meeting server 313. Digital audio signal frames forming the audio stream 396 can be provided using UDP. A digital audio signal frame is a data record containing samples for the channels of digital audio represented over a certain period of time.

The AEC modules in system 300 can accept sound originating from a sound input or microphone associated with or connected to the respective client device. For purposes of this example, client devices 350 and 360 have built-in microphones (and speaker elements), while client device 340 has an externally connected microphone 386. Client device 340 also includes an externally connected speaker element 398. Either or both of these sound elements may be part of a webcam, sound bar, or headset. Alternatively, the microphone 386 may be separate from the speaker element 398, for example, a desk or boom microphone, or a microphone that is part of a webcam. Sounds such as speech received via microphone 386 may be digitized for processing. A digital stream including those sounds is delivered to meeting server 313 as part of the A/V stream 390 after echo cancelation, and possibly additional audio processing.

Echoes in a system such as system 300 can be caused when audio generated at the far end of a two-way electronic conversation being forwarding through the meeting server 313 and output by a speaker element such as speaker element 398 acoustically affects a microphone at a client device, such as microphone 386. Such an acoustic echo, introduced because a far-end voice signal influences a near-end input device, may be distorted, for example, with high reverberation, which can make it difficult for a DSP-implemented AEC filter to converge, or can cause echo underestimation, rendering DSP-based AEC relatively ineffective because the DSP AEC algorithm cannot accurately detect and react to residual echo content. The machine-learning assisted AEC technique described herein can overcome these deficiencies.

Figure 4:
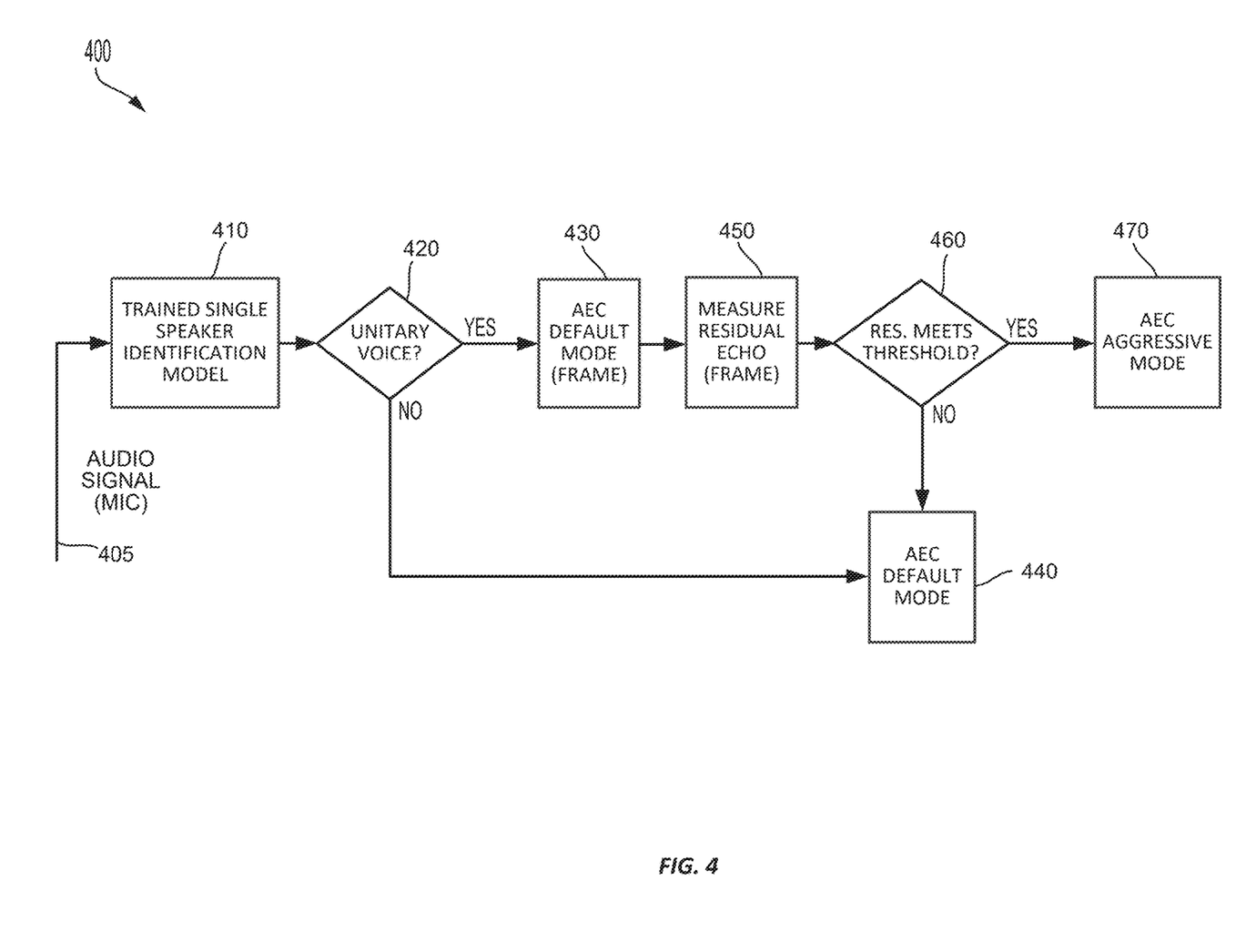
FIG. 4 illustrates an example signal processing flow that can be used in teleconferencing with machine-learning assisted AEC as described herein.

Referring now to the FIG. 4, FIG. 4 illustrates an example signal processing flow that can be used in teleconferencing with machine-learning assisted AEC as described herein. The description of the signal processing flow 400 in FIG. 4 will be made with reference to the system of FIG. 3. However, any suitable system according to this disclosure may be used, such as the example systems 100 and 200 shown in FIGS. 1 and 2.

In processing flow 400, a processor (or processors), for example, a processor such as processor 810 (discussed below with respect to FIG. 8) running in one or more client devices 340-360, accesses an input audio signal 405, which in this example is from a microphone such as microphone 386 at client device 340. The processor applies detection model 410 to the incoming signal 405. In this example, the model 410 is a pre-trained, machine-learning, single speaker identification model that can identify the signal as a unitary voice signal, for example, a signal representing the speech of a single speaker as opposed to that of multiple speakers or a speaker with other sounds. This detection takes place in real time. Determination module 420 evaluates the audio signal based on the output of the module 410. If the signal is not a unitary voice signal, audio processing continues with a default AEC mode being applied to the signal by AEC module 440 until the next signal evaluation.

Staying with FIG. 4, if the processor determines using module 420 that an initial or early audio signal frame in audio signal 405 is a unitary voice signal, default AEC mode module 430 applies a first mode (the default mode) of AEC to the audio signal frame, and a measurement of residual echo in a resulting test frame is carried out by module 450. The residual echo value is compared to a threshold by processing module 460. If the threshold is satisfied, a second or more aggressive mode of AEC is applied by aggressive mode AEC module 470 to the incoming audio signal until the next signal evaluation. A digital signal processing algorithm can also optionally detect the echo state of the initial audio frame, for example, whether distortion results primarily from an echo or whether other distortion is significant. This "pure echo" detection will be further described below with respect to FIG. 6.

Generally, computing systems may have one or more AI/ML models trained for one or more purposes. Use of such AI/ML systems, such as for certain features or functions, may be turned off by default, where a user, an organization, or both have to opt-in to utilize the features or functions that include or otherwise use an AI/ML system. User or organization consent to use the AI/ML systems or features may be provided in one or more ways, for example, as explicit permission granted by a user prior to the use of an AI/ML feature, as administrative consent configured using administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow the user to opt-out of use of the AI/ML systems or features. However, example systems and methods herein do not make use of personal or organization data. To provide processing benefits, the AI/ML processing system described herein does not use personal information (e.g., customer audio, video, chat, screen-sharing, attachments, or other communications-like customer content (such as poll results, whiteboards, or reactions)) to train any AI/ML models and instead model training is performed using one or more public domain or commercially licensed datasets that do not contain the personal information of a user or organization.

Figure 5:
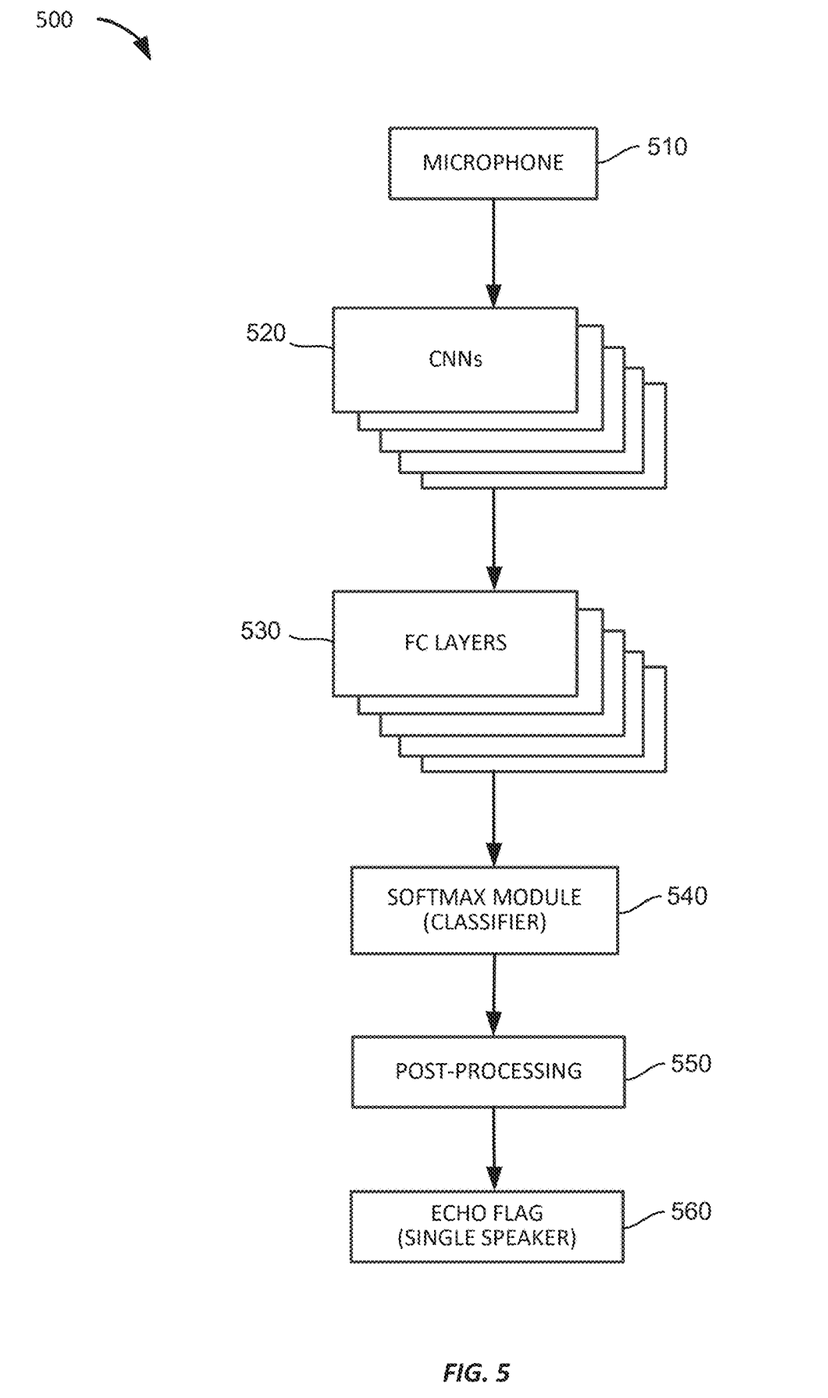
FIG. 5 illustrates another example of a signal processing flow that can be used in teleconferencing with machine-learning assisted AEC as described herein.

Referring now to the processing flow illustrated in FIG. 5, FIG. 5 illustrates another example of a signal processing flow 500 that can be used in teleconferencing with machine-learning assisted AEC as described herein. The description of the processing flow 500 in FIG. 5 will be made with reference to the system of FIG. 3 and the signal processing flow of FIG. 4. Any suitable system according to this disclosure may be used with processing flow 500, such as the example systems 100 and 200 shown in FIGS. 1 and 2.

In processing flow 500, a processor (or processors), for example, a processor such as processor 810 (discussed below with respect to FIG. 8) running in one or more client devices 340-360 executes signal processing flow 500, which depicts an example of using the machine-learning model 410 and the residual echo measurement module 450 of processing flow 400. Audio signal frames from microphone 510 are accessed by multiple convolutional neural network (CNN) layers 520. The output of CNNs 520 is accessed by multiple fully connected (FC) layers 530. Each FC layer can include a nonlinear activation layer. Examples of a nonlinear activation layer include sigmoid, tanh, rectified linear unit (ReLu), leaky ReLu, parametric ReLu, Swish, Gaussian error linear unit (GELu), and others. The CNNs and FC layers in this example are trained using available, standardized datasets prior to deployment to client devices. These datasets may be publicly available, or be commercially licensed. These training datasets can include, as examples, echo datasets and single-word datasets.

Continuing with FIG. 5, the output of FC layers 530 is classified. In this example, softmax module 540 serves as a classifier. While the FC layers can provide linear transformation, the classifier does not. The softmax function turns a vector of input values into real values that sum to 1. The input values can be positive, negative, zero, or greater than one, but the softmax transforms them into values between 0 and 1, so that they can be interpreted as probabilities. In this example, the softmax function provides probabilities, based on the output of the CNNs and FC layers, that the audio in an input frame is from a single speaker, multiple speakers, noise (including speaker(s) combined with pure noise, musical noise such as a ring, siren, horn, etc.), or far-field voice, which is sometimes mathematically represented as a babble voice. In some examples, the softmax calculation is executed in a 250 ms window of sound. However, any window size can be used, depending on the specific application of this technique, including 50 ms, 100 ms, 500 ms, or even 1 second. Similarly, in examples herein, the audio input window is 1 second, but other values can be used, for example, 500 ms or 2 seconds. The softmax function applies statistics; it is not AI based. However, a machine-learning or AI-based classifier can instead be used. In this example, the probability that the input frame contains a single speaker's voice is used to identify the audio signal as a member of a single-speaker class. The CNNs, FCs, and softmax function implement trained model 410 in FIG. 4.

In this example, post processing module 550 is included and executed in module 450 of processing flow 400 to determine the severity of the echo when the audio is identified as a unitary voice signal. In order to make an accurate determination, a spectrum analysis is carried out. The frequency domain is split into multiple frequency bands, for example, 256 frequency bands, and the energy in each of multiple frequency band is compared over time within the window of measurement. If the energy level changes across most bands over time, signal distortion is more likely caused by echo, whereas if the energy level change is restricted to a few bands, the distortion is most likely noise. The stored echo flag 560 is set based on the identification of the input audio as unitary audio and can be accessed by the processor to selectively apply either default mode AEC or aggressive mode AEC as needed. To determine the severity of the echo residual, due to interference from noise in the time domain, frequency-domain values of the change in energy of the audio before and after AEC are compared with the energy of any noise components in the same frequency bands. The following equation can be used:

$$\text{echoResPow}[k] > \alpha * \text{noisePow}[k],$$

where alpha can take a value of 10, 20, 30, 40, etc. The larger the alpha, the greater the residual, if the condition is met where k represents a frequency point from the frequency domain. The more frequency points that satisfy the condition, the more residual echo is present.

Figure 6:
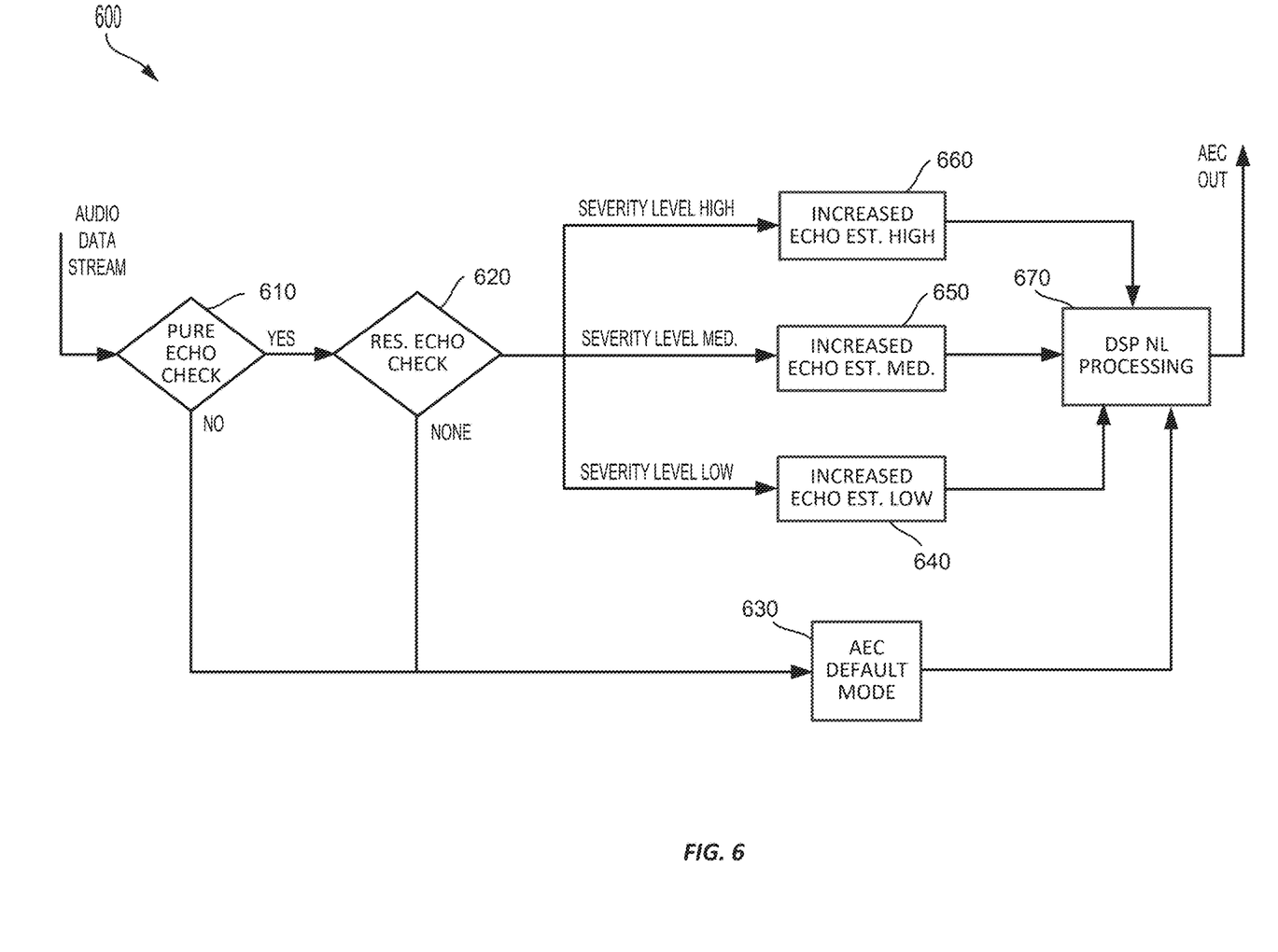
FIG. 6 illustrates a further example of a signal processing flow that can be used in teleconferencing with machine-learning assisted AEC as described herein.

Referring now to the processing flow illustrated in FIG. 6, FIG. 6 illustrates another example of a signal processing flow 600 that can be used in teleconferencing with machine-learning assisted AEC as described herein. The description of the processing flow 600 in FIG. 6 will be made with reference to the system of FIG. 3 and the signal processing flow of FIG. 5. Any suitable system according to this disclosure may be used with processing flow 500, such as the example systems 100 and 200 shown in FIGS. 1 and 2.

In processing flow 600, a processor (or processors), for example, a processor such as processor 810 (discussed below with respect to FIG. 8) running in one or more client devices 340-360 executes signal processing flow 600, which depicts an example of steady-state operation of an AI AEC module such as module 330. Signal processing flow 600 also illustrates an optional feature providing multiple levels of the second mode, aggressive AEC. Processing flow 600 can be executed based on the passage of time, changes in the make-up of the participants in a teleconference, or any other trigger condition. Processing flow also illustrates a determination block 610 regarding whether the state of any echo present in the audio data stream is a pure echo, meaning distortion is primarily caused by an echo. This determination can be made using the spectrum analysis discussed above with respect to FIG. 5. A new residual echo determination is made at determination block 610 to evaluate the residual echo in the audio data stream when the default mode AEC is briefly applied to the audio data stream. If neither one of these conditions exist, the processor switches the AEC processing to AEC default mode model 630. Terms such as "pure" and "none" are used for convenience only and are not intended to be absolute. Thresholds for these decision points can be coded using experimentation or experience.

Continuing with FIG. 6, if the aggressive mode of echo suppression is to be maintained, the level can be set based on ranges of residual echo present. In one example, instead of a single threshold, multiple thresholds are used to provide multiple aggressive modes of AEC with varying attenuation levels. An echo state that is severe compared to what the default mode of AEC can handle, but that is characterized by a relatively low severity level because it falls between a minimum threshold, and a medium threshold is set so that echo suppression module 640 is applied. Module 640 suppresses the echo based on an increased estimate from the residual echo check at block 620. An echo state that is more severe, falling between the medium threshold and the highest threshold is set so that echo suppression module 650 is applied. An echo state that is still more severe, falling above the highest threshold, is set so that echo suppression module 660 is applied. These three levels are an example. Any number of variable echo suppression levels can be used. Higher levels of echo suppression result of reductions by greater amounts in dB.

Staying with FIG. 6, nonlinear processing module 670 is applied to the audio data stream after echo cancellation, prior to the audio data stream exiting a DSP-based AEC module. In this example, non-linear processing is implemented by a DSP and is also carried out according to the severity level of the detected echo residual at block 620. In some examples, this processing includes artificially increasing the estimated value of echo at the next check to trigger a higher severity level of echo cancellation. If the higher estimated echo value results from interference, the degree of suppression will be increased, otherwise the processing will take place according to the detected residual echo.

Figure 7:
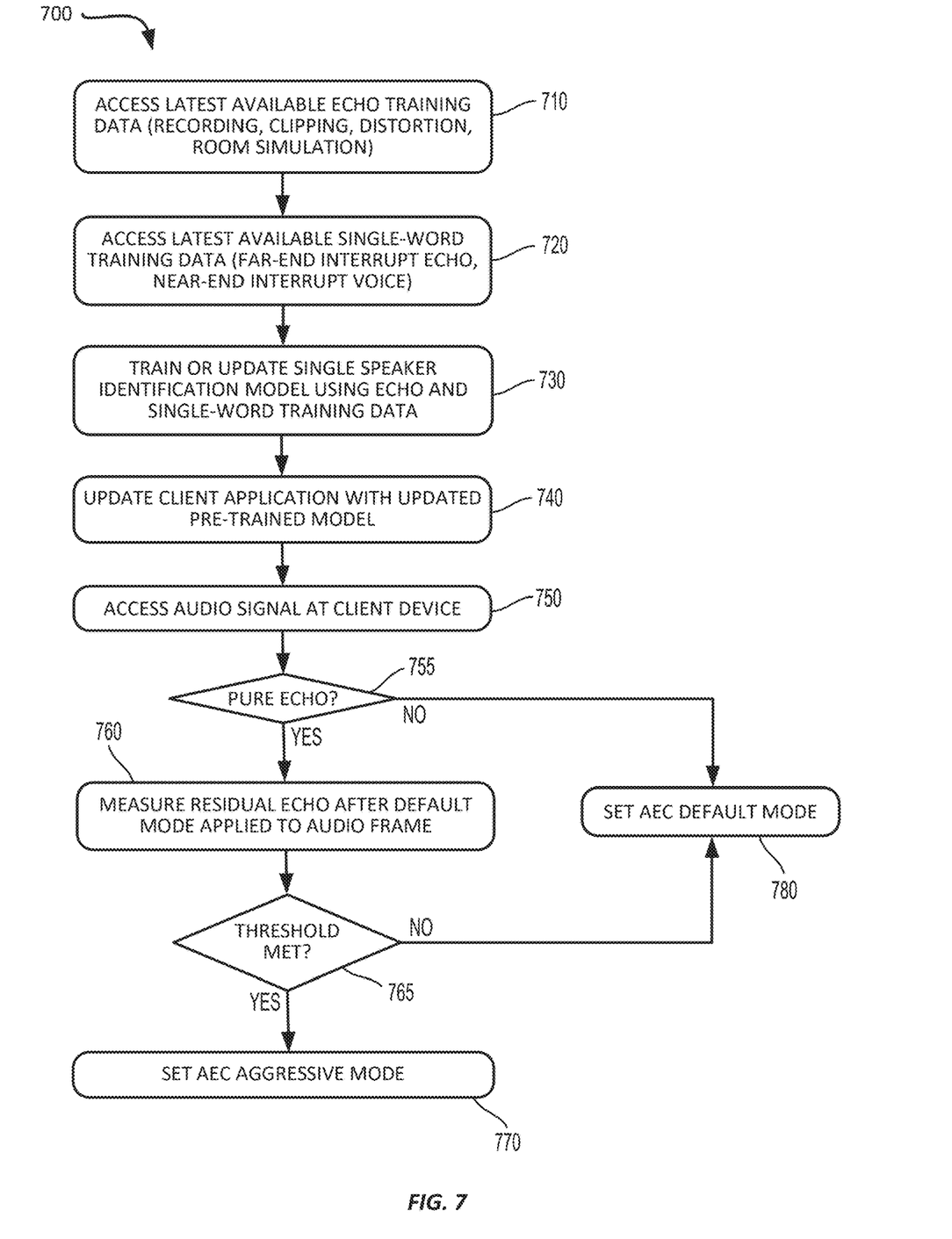
FIG. 7 illustrates an example method for deploying and using a client application as part of a system for providing machine-learning assisted AEC as described herein.

Referring now to the method illustrated in FIG. 7, FIG. 7 shows an example method 700 for training, deploying, and using a neural network model as part of a system for providing machine-learning assisted AEC as described herein. The description of the method 700 in FIG. 7 will be made with reference to the systems of FIG. 2 and FIG. 3. However, any suitable system according to this disclosure may be used, such as the example system 100 shown in FIG. 1.

At block 710, a processor or processors, for example, a processor such as processor 810 (discussed below with respect to FIG. 8) running in one or more servers hosting network services 214, accesses the latest available echo training data. Echo training datasets can include data related to, as examples, recording, clipping, distortion, and/or room simulation. These datasets can be publicly available or commercially licensed so as not to contain the personal information of the user or organization. The datasets can be based on acoustic research. The datasets can include labels for any data to provide supervised training in an automated fashion.

In this example, the pre-existing training data is not based on a normal, clear human voice, since an echo is a form of distortion. The data may have been gathered from sound recordings made with very old equipment, including old computing hardware, where relatively loud voices are clipped. The training data may also have been generated using random non-linear processing to generate distortion. Room simulation training data may include reverberation caused by relatively extreme cases, such as large halls or bathrooms.

At block 720 in FIG. 7, the processor accesses the latest available single-word training data. Single-word training datasets can include far-end interrupt echo and near-end interrupt voice data. Single-word data can enable the system to react more quickly to the characteristics of a new audio stream, since the characteristics of a single uttered word or a portion of the word can be processed by the single-speaker model. Training based on single words is a is used in order to provide real time or near-real time response to acoustic echoes. A single word represents a very short occurrence of an echo that can otherwise be difficult for algorithms to react to. Training with single-word data can provide for distortion and echo to be detected in as little as 100 ms, whereas a full second might otherwise be required.

Continuing with FIG. 7, at block 730, the processor trains, updates, or retrains the single speaker identification model using the latest available echo and single-word training datasets. At block 740, the client application is updated at a client device, such as client device 340 shown in FIG. 3. The application update in this example includes an updated, pre-trained single-speaker model, or training parameters that, when applied to the code for the existing instance of the model resident on the client device, update the existing instance of the model already installed. For example, training parameters can include updated node weights and biases for the CNNs and FC layers.

Staying with FIG. 7, at block 750, the audio signal is accessed at the client device. For example, the audio signal from microphone 386 may be accessed. At block 755, a determination is made as to whether the audio signal includes a pure echo rather than distortion from other causes. The term "pure" is not meant to be an absolute. A threshold for the presence of other distortion can be engineered into the system. Assuming the signal contains a relatively pure echo, the residual echo after the application of the default mode AEC to at least one audio frame is measured at block 760. At block 765, the result of this measurement is compared to a threshold. If the threshold is met, meaning that the threshold is exceeded or equaled, or in some examples, just exceeded, the aggressive mode AEC is set at block 770. If either of the conditions in blocks 755 and 765 are not met, the default AEC mode is set at block 780.

Figure 8:
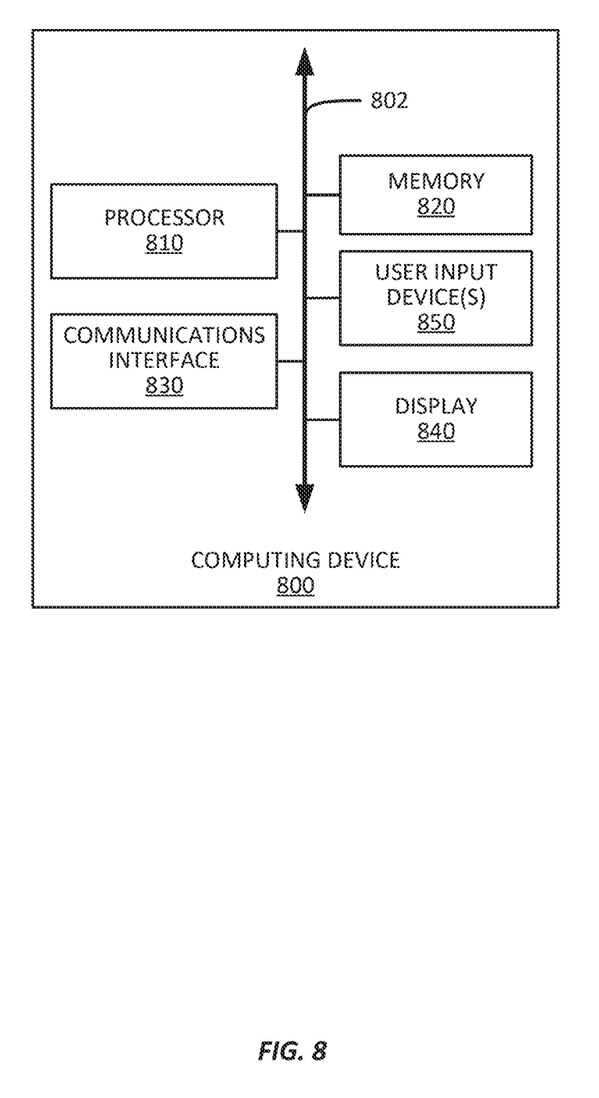
FIG. 8 shows an example computing device suitable for use with any disclosed systems or methods according to this disclosure.

Referring now to FIG. 8, FIG. 8 shows an example computing device 800 suitable for use in example systems or methods providing machine-learning assisted AEC as described herein. The example computing device 800 includes a processor 810 which is in communication with the memory 820 and other components of the computing device 800 using one or more communications buses 802. The processor 810 is configured to execute processor-executable instructions stored in the memory 820 to perform one or more methods for providing automatic audio equalization. The computing device, in this example, also includes one or more user input devices 850, such as a keyboard, mouse, touchscreen, video input device (e.g., one or more cameras), microphone, etc., to accept user input, for example user input directed to activating or interacting with a videoconferencing application such as videoconferencing client device 340 or videoconferencing app 336. Echo detection can also make use of the one or more of the user input devices 850. The computing device 800 also includes a display 840 to provide visual output to a user.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in at least one memory device, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise executable code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C. Comparative features described herein include the concept of equality. As an example, the phrase, "greater than" can alternatively mean, "greater than or equal to."

That which is claimed is:

1. A method comprising:
   accessing an audio signal;
   identifying, using a trained, machine-learning ("ML") model, the audio signal as a unitary voice signal;
   applying a first mode of acoustic echo cancelation (AEC) to an audio frame of the unitary voice signal to produce a test frame;
   measuring a residual echo in the test frame to produce a residual value;
   comparing the residual value to a threshold; and
   applying a second mode of AEC to the audio signal based on the comparing.

2. The method of claim 1, wherein the threshold comprises a plurality of thresholds, and the second mode of AEC comprises a plurality of modes with different attenuation levels for an echo in the audio signal.

3. The method of claim 1, further comprising:
   setting a stored echo flag based on the identifying of the audio signal as a unitary voice signal; and
   selectively applying the first mode or the second mode of AEC to the audio signal based on the stored echo flag.

4. The method of claim 1, further comprising receiving or updating the trained ML model as configured by training datasets including echo data and single-word data.

5. The method of claim 4, wherein:
   the echo data comprises recording, clipping, distortion, and room simulation data; and
   the single-word data comprises far-end interrupt echo data and near-end interrupt voice data.

6. The method of claim 4, wherein the trained ML model comprises:
   a plurality of convolutional neural networks with node weights configured by the training datasets;
   a classifier configured to identify a single-speaker class; and
   a plurality of fully connected layers disposed between the plurality of convolutional neural networks and the classifier.

7. The method of claim 1, further comprising post processing the unitary voice signal.

8. A system comprising:
   a processor; and
   at least one memory device including instructions that are executable by the processor to cause the processor to:
   access an audio signal;
   identify, using a trained, machine-learning ("ML") model, the audio signal as a unitary voice signal;
   apply a first mode of acoustic echo cancelation (AEC) to an audio frame of the unitary voice signal to produce a test frame;
   measure a residual echo in the test frame to produce a residual value;
   compare the residual value to a threshold; and
   apply a second mode of AEC to the audio signal based on the comparing.

9. The system of claim 8, wherein the threshold comprises a plurality of thresholds, and the second mode of AEC comprises a plurality of modes with different attenuation levels for an echo in the audio signal.

10. The system of claim 8, wherein the instructions are further executable to cause the processor to:
    set a stored echo flag based on the identifying of the audio signal as a unitary voice signal; and
    selectively apply the first mode or the second mode of AEC to the audio signal based on the stored echo flag.

11. The system of claim 8, wherein the instructions are further executable to cause the processor to receive or update the trained ML model as configured by training datasets including echo data and single-word data.

12. The system of claim 11, wherein:
the echo data comprises recording, clipping, distortion, and room simulation data; and
the single-word data comprises far-end interrupt echo data and near-end interrupt voice data.

13. The system of claim 11, wherein the trained ML model comprises:
a plurality of convolutional neural networks with node weights configured by the training datasets;
a classifier configured to identify a single-speaker class; and
a plurality of fully connected layers disposed between the plurality of convolutional neural networks and the classifier.

14. The system of claim 8, wherein the instructions are further executable to cause the processor to post process the unitary voice signal.

15. A non-transitory computer-readable medium comprising code that is executable by a processor for causing the processor to:
access an audio signal;
identify, using a trained, machine-learning ("ML") model, the audio signal as a unitary voice signal;
apply a first mode of acoustic echo cancelation (AEC) to an audio frame of the unitary voice signal to produce a test frame;
measure a residual echo in the test frame to produce a residual value;
compare the residual value to a threshold; and
apply a second mode of AEC to the audio signal based on the comparing.

16. The non-transitory computer-readable medium of claim 15, wherein the threshold comprises a plurality of thresholds, and the second mode of AEC comprises a plurality of modes with different attenuation levels for an echo in the audio signal.

17. The non-transitory computer-readable medium of claim 15, wherein the code is executable for causing the processor to receive or update the trained ML model as configured by training datasets including echo data and single-word data.

18. The non-transitory computer-readable medium of claim 17, wherein:
the echo data comprises recording, clipping, distortion, and room simulation data; and
the single-word data comprises far-end interrupt echo data and near-end interrupt voice data.

19. The non-transitory computer-readable medium of claim 17, wherein the trained ML model comprises:
a plurality of convolutional neural networks with node weights configured by the training datasets;
a classifier configured to identify a single-speaker class; and
a plurality of fully connected layers disposed between the plurality of convolutional neural networks and the classifier.

20. The non-transitory computer-readable medium of claim 15, wherein the code is executable for causing the processor to post process the unitary voice signal.

* * * * *